Jan. 16, 1968  R. O. PLATT ET AL  3,363,602
APPARATUS FOR HANDLING AND IMPREGNATING BRICK
Filed Feb. 14, 1964
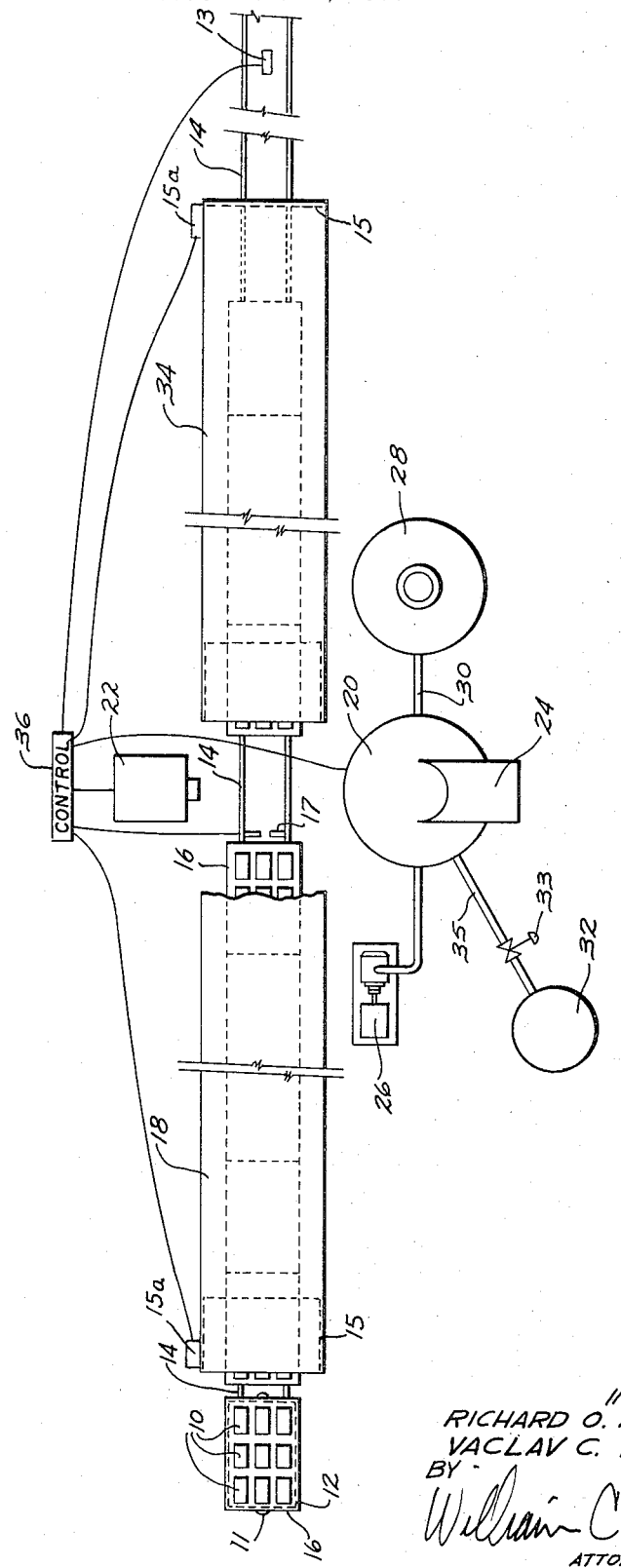
INVENTORS
RICHARD O. PLATT &
VACLAV C. VEVERKA
BY
William C. Nealon
ATTORNEY 3,363,602
APPARATUS FOR HANDLING AND
IMPREGNATING BRICK
Richard O. Platt, Bethel Park, and Vaclav C. Veverka, Pittsburgh, Pa., assignors to Harbison-Walker Refractories Company, Pittsburgh, Pa., a corporation of Pennsylvania
Filed Feb. 14, 1964, Ser. No. 344,970
5 Claims. (Cl. 118—6)

The present invention relates to the treatment of refractory brick. More particularly, the invention relates to a system for handling refractory brick before, during, and after impregnation thereof with tar.

Great interest in the oxygen steelmaking process has stimulated considerable pressure on the manufacturers of refractories to supply products better able to withstand the chemical and physical conditions present in the process furnace.

In the oxygen converter process, the slag produced is essentially basic; therefore, a lining of basic refractory material has been used. Also, the exposed surfaces of the basic refractory must show good resistant to abrasion by charge materials as well as the movement of the molten steel during pouring. And, the refractory must be resistant to thermal spalling resulting from abrupt changes in temperature occurring in the charging, blowing and pouring steps.

A brick appearing to be highly successful in the slag contacting areas of the oxygen converter is a fired basic refractory shape consisting of, for example, dead burned magnesite or dead burned dolomite and impregnated with tar or pitch. However, heretofore, methods employed to handle the refractory brick through tar impregnation have been uneconomical, time consuming, and not easily amenable to mass production. For instance, it has been the general practice for workmen to manhandle a tray or pallet of previously prepared refractory shapes, dip them in a pool of molten tar, and then remove the brick for drying by natural convection in the plant.

Accordingly, an object of the present invention, is to provide a scheme for the commercial mass production of tar impregnated basic refractory brick.

Another object of the invention is to provide a system for the handling and treatment of refractory brick.

A further object is to reduce the danger normally associated with previous methods.

Other objects of the invention will appear hereinafter.

In order to more fully understand the nature and scope of the invention, reference should be had to the following detailed description and drawing, the single figure of which is a plan view schematically illustrating a practice of the invention.

In accordance with the present invention and in attainment of the foregoing objects, there is provided a mechanized system for handling and treating basic ceramically bonded refractory brick. The system comprises a pair of parallel rails and a plurality of vehicles positioned on and arranged to travel freely on the rails along with means to move the vehicles. One or more refractory brick supporting racks are disposed on each vehicle. The rack is constructed of a heat resistant material and is arranged to allow the free flow of a fluid therethrough in contact with the supported brick. An open ended, elongated oven is disposed over a portion of the parallel rails which pass therethrough between said ends. Means, such as, sliding doors, are provided for opening and closing the open ends of the oven for selectively encapsulating the portion of the rails within the oven. An open ended, elongated cooling chamber is disposed adjacent but spaced from the oven so that the open ends of the chamber are in alignment with those of the oven. The parallel rails pass through the cooling chamber in the same manner as through the oven without a failure in continuity. Similarly, means are provided for opening and closing the ends of the chamber. A tar impregnating vessel is located between the oven and the cooling chamber.

In addition, there is provided co-ordinating means for the tandem sequential movement of the vehicles. One of said means moves the vehicles over the rails through the oven and cooling chamber in a successive series of equidistant movements. Other means halt the vehicles on the rails in the space between the oven and chamber at the end of one of the equidistant movements. Another means is provided for transferring the racks from the vehicle on the rails between the oven and cooling chamber to the impregnating vessel, then removing them from the vessel after impregnation of the brick and replacing them on the same vehicle for subsequent equidistant movements. If desired, all of the movements of the vehicles and racks may be automatically co-ordinated by a common means.

In a particular embodiment of the invention, reference is made to the drawing. In general, the sequence which follows will be used to implement the system of the invention.

Brick 10 to be tar impregnated may be loaded manually or automatically onto impregnating racks 12 along a predetermined position on the parallel rails 14. There the loaded racks are positioned on a train of vehicles 16. The racks are composed of a nonreactive, heat resistant material, such as, iron and iron base alloys, and are sufficiently vented to allow the free flow of fluid therethrough. Also, the racks are adapted with means 11, i.e., handles for direct engagement with a crane or the like. Each of the loaded racks 12 and vehicles 16 pass through a preheating oven 18. The oven is of such length as to accomodate a plurality of vehicles at once. The vehicles (with loaded racks) move through the oven by the "train shuttle system," the end vehicle of the train being advanced by such as a hydraulic pusher 13. As the train advances, each vehicle 16 moves through each position in the oven 18 and is replaced by a succeeding vehicle. The doors 15 of the oven are opened automatically, by means of a hydraulic mechanism 15a at each end to allow the exit of a vehicle containing heated brick and simultaneously allow the entrance of another vehicle.

As each vehicle leaves the preheat oven, it is accurately positioned on the centerline of a tar impregnator 20 which is located a short distance from the rails 14 in the space between the oven and cooling chamber by means of a hydraulically operated stop 17 that engages the car and arrests the train advance. Here the loaded rack 12 is lifted from the vehicle 16 by a hydraulically operated overhead traveling crane 22 and is lowered inside the tar impregnator 20. The crane 22 moves out of position allowing the hydraulically controlled impregnator lid 24 to close and lock. At this time, the actual impregnation cycle begins. Initially the impregnating vessel 20 is subjected to a vacuum immediately after the brick are deposited therein to remove the air from the interstices of the brick, by means of a vacuum pump 26 connected to the vessel.

Molten tar is pumped from a tar storage tank 28 through a conduit 30 to the impregnating vessel 20. The vessel is then pressurized with an inert gas, such as, $CO_2$ or $N_2$ from a gas tank 32 which is under about 300 p.s.i. gas pressure. Adjustment of a pressure regulating valve 33 in the gas supply pipe 35 determines the amount and pressure of the pressurizing gas in the impregnating vessel.

After a timed interval during which the bricks and liquid are under pressure in the vessel 20, the pressurizing gase is vented to the atmosphere. The tar is then pumped back into the tar storage tank 28.

At the end of the impregnation cycle, the impregnator door 24 is unlocked and opened. The crane 22 re-engages the rack of impregnated brick and lifts it out of the impregnator returning it to its vehicle. The crane again moves out of position to permit the train in advance automatically. The car positioner stop retracts and the train advances the rack of impregnated brick into the forced air cooler 34.

The forced air cooler 34 like the preheat oven 18 will accommodate a plurality of vehicles. As each rack 12 is positioned on the vehicle 16 after removal from the impregnating vessel 20, hydraulically operated sliding doors 15 activated by mechanism 15a on each end of the cooling chamber are opened. This allows a rack containing impregnated brick to enter the cooling chamber and simultaneously allows a rack containing cooled brick to leave the chamber at the other end thereof. There the rack is removed from the vehicle and the bricks are unloaded therefrom.

The entire system operation may be controlled automatically from a control panel 36 so as to move each vehicle through the oven, transfer each rack to the impregnator, impregnate the brick on the rack, remove each rack therefrom and replace on the vehicle, and transport each vehicle through the cooling chamber in tandem sequence.

After the vehicles have been unloaded, any convenient means may be employed to convey them back to the starting position for recycling through the system. Further, the tar impregnating vessel 20 may, if desired, be located directly on the parallel rails 14 between the oven 18 and cooling chamber 34 so that the rails pass through the vessel, the space between the chamber and oven being greater than the length of a vehicle. Doors may then be provided on sides of the vessel to allow a vehicle to pass therethrough for impregnation without being lifted from the parallel rails. This would eliminate the necessity of employing a crane or some other lifting means.

Since certain changes in the above described system and sequence of operation may be made without departing from its scope, it is intended that accompanying description and drawing be interpreted as illustrative and not limiting.

We claim:

1. A system for handling and tar impregnating ceramically bonded refractory brick comprising, in combination,
    (1) a pair of parallel rails,
    (2) a plurality of vehicles positioned on above the rails and arranged to travel freely thereon,
    (3) at least one rack supported above each vehicle, each rack being capable of supporting brick and arranged to allow the free flow of fluid therethrough in contact with the supported brick,
    (4) an open ended elongated oven disposed over a portion of the parallel rails which pass therethrough,
    (5) an open ended, elongated, cooling chamber disposed adjacent but spaced from the oven, the open ends of the cooling chamber being in alignment with those of the oven, a portion of said rails also passing through said cooling chamber,
    (6) a tar impregnating vessel located between the oven and cooling chamber for impregnating brick on the racks after leaving the oven and before entering the cooled chamber, including means for evacuating the tar impregnating vessel to remove air from the interstices of brick deposited therein, means for transferring molten tar to and from the vessel, and means for pressurizing the vessel,
    (7) means for moving the vehicles over the rails through the oven and the cooling chamber in a successive series of equidistant movements,
    (8) means for opening and closing the ends of the oven and cooling chamber to selectively encapsulate said vehicles therein,
    (9) means for halting the vehicles on the rails in the space between the oven and chamber at the end of one of said equidistant movements,
    (10) means for transferring the racks, from the vehicle on the rails between said oven and cooling chamber, to the impregnating vessel, then removing them from the vessel after impregnation of the brick and replacing them on the same vehicle, and
    (11) means for again transferring the vehicles through one of said equidistant movements, and
    (12) means for coordinating the tandem sequential movement of the vehicles along the rails through the oven and cooling chamber and the rack containing the brick to and from the tar impregnating vessel.

2. The system of claim 1 in which the vehicles are halted by means which is a stop that engages the vehicle and arrests the train advance.

3. The system of claim 1 in which the racks are adapted with means for direct engagement with a crane.

4. The system of claim 1 in which the means for engaging the racks and transferring them to and from the impregnator is a crane.

5. The system of claim 1 in which the tar impregnating vessel is located a relatively short distance from the rails in the space between the oven and cooling chamber.

References Cited

UNITED STATES PATENTS

| | | | |
|---|---|---|---|
| 1,018,999 | 2/1912 | Wales | 266—4 |
| 1,072,705 | 9/1913 | Destribats | 118—50 |
| 1,290,384 | 1/1919 | Smallwood | 266—4 |
| 1,818,976 | 8/1931 | Goff | 118—50 X |
| 2,048,937 | 7/1936 | Larson | 118—66 |
| 2,552,612 | 5/1951 | Adams et al. | 118—423 X |
| 2,716,989 | 9/1955 | Joy | 134—66 |
| 2,859,029 | 11/1958 | Joy | 134—76 X |
| 2,945,579 | 7/1960 | Barton | 134—83 X |

FOREIGN PATENTS 9,024  1912  Great Britain.

CHARLES A. WILLMUTH, *Primary Examiner.*

JOHN P. McINTOSH, *Assistant Examiner.*